US011453416B2

(12) United States Patent
Metzner et al.

(10) Patent No.: US 11,453,416 B2
(45) Date of Patent: Sep. 27, 2022

(54) DRIVE BEHAVIOR ESTIMATION OF A PASSENGER TRANSPORT SYSTEM

(71) Applicant: ZF Friedrichshafen AG, Friedrichshafen (DE)

(72) Inventors: Jannik Metzner, Friedrichshafen (DE); Daniel Fafula, Friedrichshafen (DE); Florian Maile, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 70 days.

(21) Appl. No.: 16/842,307

(22) Filed: Apr. 7, 2020

(65) Prior Publication Data
US 2020/0317225 A1  Oct. 8, 2020

(30) Foreign Application Priority Data

Apr. 8, 2019 (DE) .......................... 102019205017.4

(51) Int. Cl.
*B60W 60/00* (2020.01)
*B60W 40/08* (2012.01)
*G05D 1/02* (2020.01)
*G08G 1/123* (2006.01)

(52) U.S. Cl.
CPC ........ *B60W 60/0025* (2020.02); *B60W 40/08* (2013.01); *G05D 1/0214* (2013.01); *G08G 1/123* (2013.01); *G05D 2201/0213* (2013.01)

(58) Field of Classification Search
CPC .............. B60W 60/0025; B60W 40/08; G05D 1/0214; G05D 2201/0213; G08G 1/123
See application file for complete search history.

(56) References Cited

U.S. PATENT DOCUMENTS

| 6,792,259 B1* | 9/2004 | Parise | B60L 8/00 |
| | | | 455/343.1 |
| 2014/0095230 A1* | 4/2014 | Duan | G06N 5/04 |
| | | | 705/6 |
| 2015/0073703 A1* | 3/2015 | Jouaux | G01C 21/34 |
| | | | 701/465 |
| 2015/0294298 A1* | 10/2015 | Michishita | G06Q 20/308 |
| | | | 705/13 |

(Continued)

FOREIGN PATENT DOCUMENTS

DE  10 2012 011 150 A1  12/2013
DE  10 2013 202 463 A1  8/2014

(Continued)

OTHER PUBLICATIONS

Office Action dated Oct. 25, 2019 for German Patent Application No. 10 2019 205 017.4, (12 pp.), note: pp. 1 and 2 are English language Explanations to Section C. Result of Determination Document.

*Primary Examiner* — Hussein Elchanti
(74) *Attorney, Agent, or Firm* — Crowell & Moring LLP

(57) ABSTRACT

A method for controlling a motor vehicle may include one or more of the following steps: scanning an environment of the motor vehicle; detecting a passenger transport device stopped in front of the motor vehicle; detecting a movement of at least one person in the vicinity of the passenger transport device; and determining the probability that the passenger transport device will merge into traffic in front of the motor vehicle on the basis of the movement of the person.

20 Claims, 2 Drawing Sheets

(56) References Cited

U.S. PATENT DOCUMENTS

| | | | | |
|---|---|---|---|---|
| 2015/0294566 | A1* | 10/2015 | Huang | G08G 1/133 |
| | | | | 701/41 |
| 2016/0096519 | A1* | 4/2016 | Goudy | B60W 50/14 |
| | | | | 701/41 |
| 2017/0096095 | A1* | 4/2017 | Uhrenholt | B60Q 1/525 |
| 2018/0105107 | A1* | 4/2018 | Hassan-Shafique | |
| | | | | G01S 17/931 |
| 2018/0211541 | A1* | 7/2018 | Rakah | B60W 60/00253 |
| 2020/0207371 | A1* | 7/2020 | Dougherty | B60W 60/0017 |

FOREIGN PATENT DOCUMENTS

| | | |
|---|---|---|
| DE | 10 2013 208 763 A1 | 11/2014 |
| DE | 10 2013 211 244 A1 | 12/2014 |
| DE | 10 2018 007 558 A1 | 3/2019 |

\* cited by examiner

DRIVE BEHAVIOR ESTIMATION OF A PASSENGER TRANSPORT SYSTEM

RELATED APPLICATION

This application claims the benefit and priority of German Patent Application DE 10 2019 205 017.4, filed Apr. 8, 2019, which is incorporated by reference herein in its entirety.

TECHNICAL FIELD

The present disclosure relates to the control of a motor vehicle. In particular, the present embodiments relate to the determination that a passenger transport system is merging into traffic in front of the motor vehicle.

BACKGROUND

In particular in a city, a transport means in the public transport system may use the same road system used by individual motor vehicles. By way of example, a public bus may drive on a conventional road and stop at predetermined bus stops to let passengers in and out. When departing, the bus may have right of way over other traffic, in order to stay on schedule. An inattentive driver in a trailing vehicle may be surprised as a result, thus increasing the probability of an accident.

It has been proposed that the public bus transmit a wireless signal to surrounding road users in order to announce its intentions. This technology is also referred to as car-to-car communication (car-to-car, C2C), and requires that all participating road users be equipped with corresponding communication means.

One of the fundamental objects of the present embodiments is to provide an improved technology for determining the intention of a stopped passenger transport device to depart.

BRIEF DESCRIPTION OF THE DRAWINGS

Certain embodiments shall now be described in greater detail with reference to the attached figures, in which.

DETAILED DESCRIPTION

Figure 1:
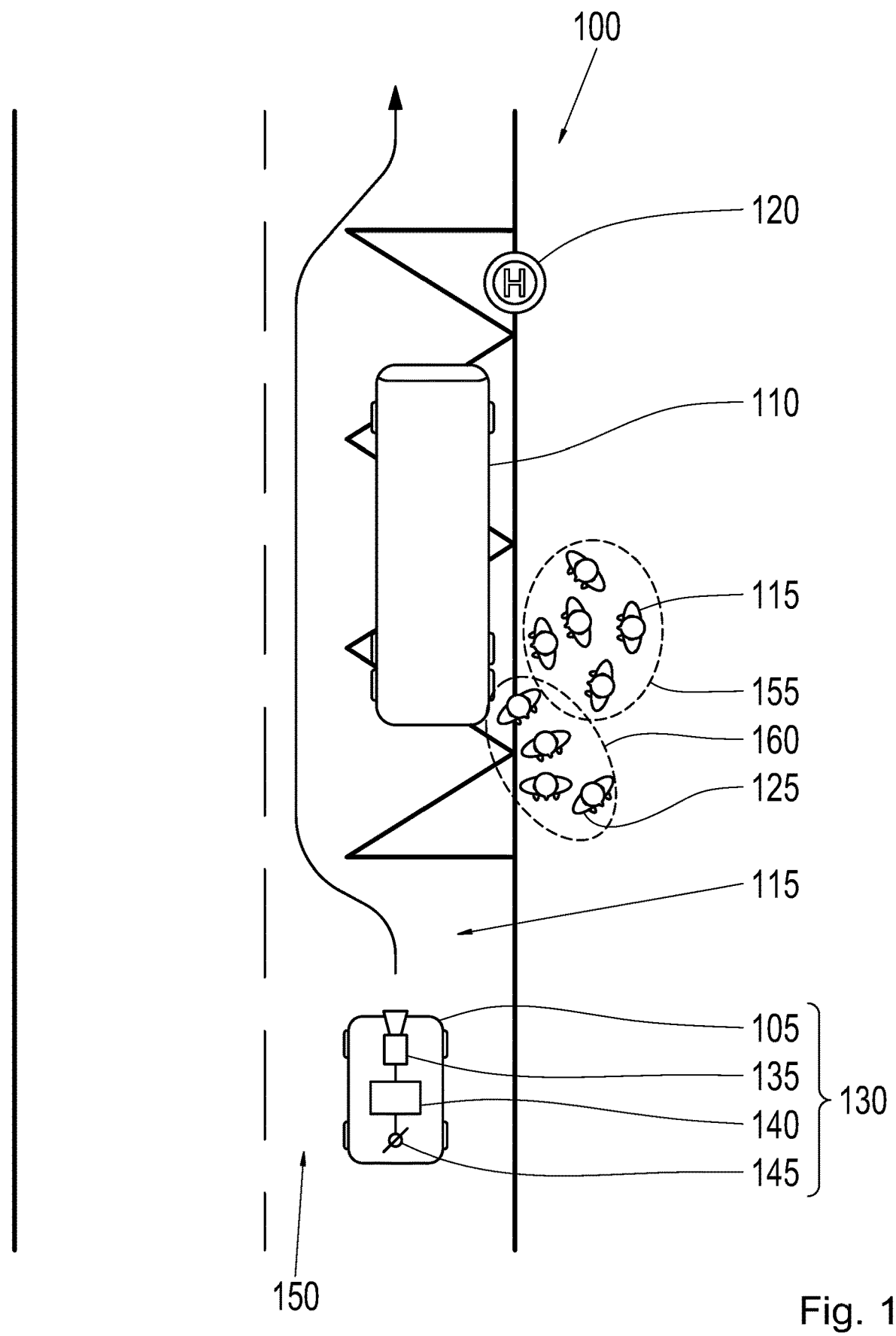
FIG. 1 shows a system.

A method for controlling a motor vehicle comprises steps for scanning a vehicle EP passenger transport device; and determining the probability that the passenger transport device will merge into traffic in front of the motor vehicle, based on the movement of the person.

It has been determined that a passenger transport device will probably depart when passengers are no longer boarding or exiting the vehicle. It is possible to estimate when this will be completed based on the movement of the person. The passenger transport device can be, e.g., a bus, a city bus, a regional bus, rural bus, a tour bus, a public bus, a streetcar, a taxi, a shuttle, or some other road or rail vehicle that is designed for transporting people.

It is particularly preferred that it is determined that the person is a passenger in the passenger transport device on the basis of the movement of the person. A passenger is a person that boards (or is boarding) or exits (or is exiting) the passenger transport device while the passenger transport device is stopped. Predetermined maximum times between when the person is observed and when the person boards or exits can be predetermined. In other words, a person who is going to board the passenger transport device within a first predetermined time period can be regarded as a passenger. Likewise, a person who exits the passenger transport device within a second predetermined time period can also be regarded as a passenger.

In one embodiment, only those people located outside the passenger transport device are taken into account, because they are easier to detect. In another embodiment, people inside the passenger transport device can also be taken into account. In this case, a person who is going to the passenger transport device within a third time period or a person who is going to board the passenger transport device within a fourth predetermined time period, is also regarded as a passenger.

It is also preferred that it be determined on the basis of the movement of the passenger, whether the passenger is boarding the passenger transport device or exiting the passenger transport device. The probability is preferably determined on the basis of this information. By distinguishing between an exiting and an boarding passenger, an upcoming departure can be better determined. By way of example, the passenger transport device can depart when the passenger who just exited has been detected. Alternatively, if a passenger has been detected who wants to board, it can normally be assumed that the vehicle will not depart.

The probability of departure can be determined on the basis of the average movement of a group of boarding or exiting passengers. The movement of the group can be better determined even when only a portion of the people comprising the group can be detected at times. This can result in particular in an improved determination when a group of people is boarding the vehicle.

The probability can be determined on the basis of the movements of an exiting and a boarding group. In this case, it can normally be assumed that people first exit the passenger transport device, before other people board. The movements of the groups or the movement of a person in the one group in relation to the other group can thus be predicted more accurately.

The probability can be determined on the basis of the number of people in the group. As a result, how the movement behavior of a group can be dependent on its size can also be taken into account. If the current number of passengers approaches a predetermined maximum, exiting and boarding may be slowed down. An expected exiting rate can also be affected by the size of the group of people waiting to board.

The probability can also be determined on the basis of how long a passenger transport device has been observed to stop. A typical stopping period of the passenger transport device can be assumed for this. As the observed stopping period approaches the length of the assumed stopping period, the probability that the passenger transport device is about to depart increases. Furthermore, it can be assumed that the departure is about to take place the longer the passenger transport device has been stopped.

It can be determined that the passenger transport device will stop at a predetermined stop. As a result, the passenger transport device can be more precisely classified, e.g. as a public bus or a streetcar, and an associated behavior can be assumed. In addition, if it has been determined that the passenger transport device is, e.g. a taxi that has stopped at a bus stop, it will not be treated in the same manner as a bus.

The probability can also be determined with regard to a predetermined, upcoming time period. This time period can comprise, in particular, a planned overtaking of the stopped passenger transport device by the vehicle. An earlier time period, or a time period lying further in the future may be less relevant for deciding to overtake a stopped passenger transport device. In other words, it is more difficult to determine when the passenger transport device will depart in a time period that takes place within the predetermined time period for a departure of the passenger transport device.

If the determined probability exceeds a predetermined threshold value, a signal can be output. The signal can be directed to a person on board the motor vehicle, in particular the driver, and can be in the form of a optical, acoustic, or haptic signal. The signal can also be sent to a control unit in the motor vehicle that controls the motor vehicle longitudinally and/or laterally. The signal can comprise the determined probability, and taken into account in deciding whether or not to overtake a stopped passenger transport device.

According to another aspect, a device for controlling a motor vehicle comprises a scanner for scanning a vehicle environment, and a processor. The processor is configured to detect a passenger transport device stopped in front of the motor vehicle, to detect a movement of at least one person in the vicinity of the passenger transport device, and to determine a probability that the passenger transport device will merge into traffic in front of the motor vehicle on the basis of the movement of the passenger.

The processor can be configured to execute a method described herein, in part or in its entirety. The processor can comprise a programmable microcomputer or microcontroller for this, and the method can be in the form of a computer program containing programming code. The computer program can also be stored on a computer readable medium. Features or advantages of the method can be applied to the device, or vice versa.

FIG. 1 shows a system 100 comprising a motor vehicle 105 and a passenger transport device 110, which are on the same road. By way of example, the passenger transport device 110 comprises a bus in this case. The passenger transport device 110 and the motor vehicle 105 are travelling in the same direction, and the motor vehicle 105 is preferably travelling along the road, while the passenger transport device 110 has stopped or is stopping. The passenger transport device 110 is preferably stopped at a bus stop 120, which may take up part of the lane that the motor vehicle 105 uses.

The motor vehicle can be, e.g., a typical passenger car or a truck, or a bus, that can be driven by a driver. The motor vehicle 105 can also have a system for semi-automated, automated, or autonomous driving.

The passenger transport device 110 normally stops to allow passengers 125 to board and/or exit. The passenger transport device 110 normally departs as soon as both procedures have been completed. It can then merge into traffic, e.g. into the lane in which the motor vehicle 105 is travelling, or in front of the motor vehicle 105. If the motor vehicle 105 does not expect this, and is planning to overtake, or is already overtaking, the passenger transport device 110, the probability of a collision is increased.

A control unit 130 is preferably installed on board the motor vehicle 105, which also preferably comprises a scanner 135, a processor 140, and an interface 145. The scanner 135 comprises one or more sensors for scanning an environment 150 of the motor vehicle 105, in particular in a region lying in front of the motor vehicle 105. By way of example, the scanner can comprise a radar sensor, lidar sensor, optical camera, and/or a depth-of-field camera. Measurement values from numerous sensors can be combined with one another in order to identify an object in the environment 150 of the motor vehicle. In particular, the passenger transport device 110 and a person are to be identified, wherein the person is also preferably a passenger 125.

The processor 140 is preferably configured for object identification. Furthermore, a detected object can be observed for a predetermined period of time in order to determine its trajectory (or whether or not it is stationary). By way of example, a person can determined to be a passenger 125 based on its movements. The object identification can also be carried out by the processor 140.

A passenger 125 can be assigned to a first group 155 that comprises boarding passengers 125, or a second group 160 that comprises exiting passengers 125. A person waiting at the bus stop 120 who moves toward an approaching or stopped passenger transport device 110 that is awaiting other passengers 125 to exit, or may be crowded together with other passengers 125 in the vicinity of an entry to the passenger transport device 110, can be assigned to the first group 155. A person exiting the passenger transport device 110 and who may subsequently leave the bus stop 120, e.g. by crossing the street 115, can be assigned to the second group 160. The processor 140 can assign passengers 125 to one of the groups 155, 160.

The interface 145 is configured to output a signal that indicates that the passenger transport device 110 is about to depart. More precisely, the signal can indicate that the passenger transport device 110 will probably depart within a predetermined, upcoming time period. The time period can be, e.g. 10, 5, 2 or 1 seconds, and the signal can be output when a determined probability exceeds a predetermined threshold value, e.g. 80%, 90%, 95% or 99%. Different signals can be assigned to different time periods. Different time periods can have different threshold values assigned to them.

In one embodiment, the signal is intended for a driver of the motor vehicle 105, and comprises a warning signal. In another embodiment, which can be combined therewith, the signal is intended for a driver assistance system or an autonomous control system for the motor vehicle 105. In yet another embodiment, the signal can act directly on an actuator that affects the longitudinal and/or lateral control of the motor vehicle 105. If the departure of the passenger transport device 110 has been determined to be probable, a planned overtaking of the passenger transport device 110 can be prevented or stopped, or the motor vehicle 105 can swerve to avoid the passenger transport device 110.

Figure 2:
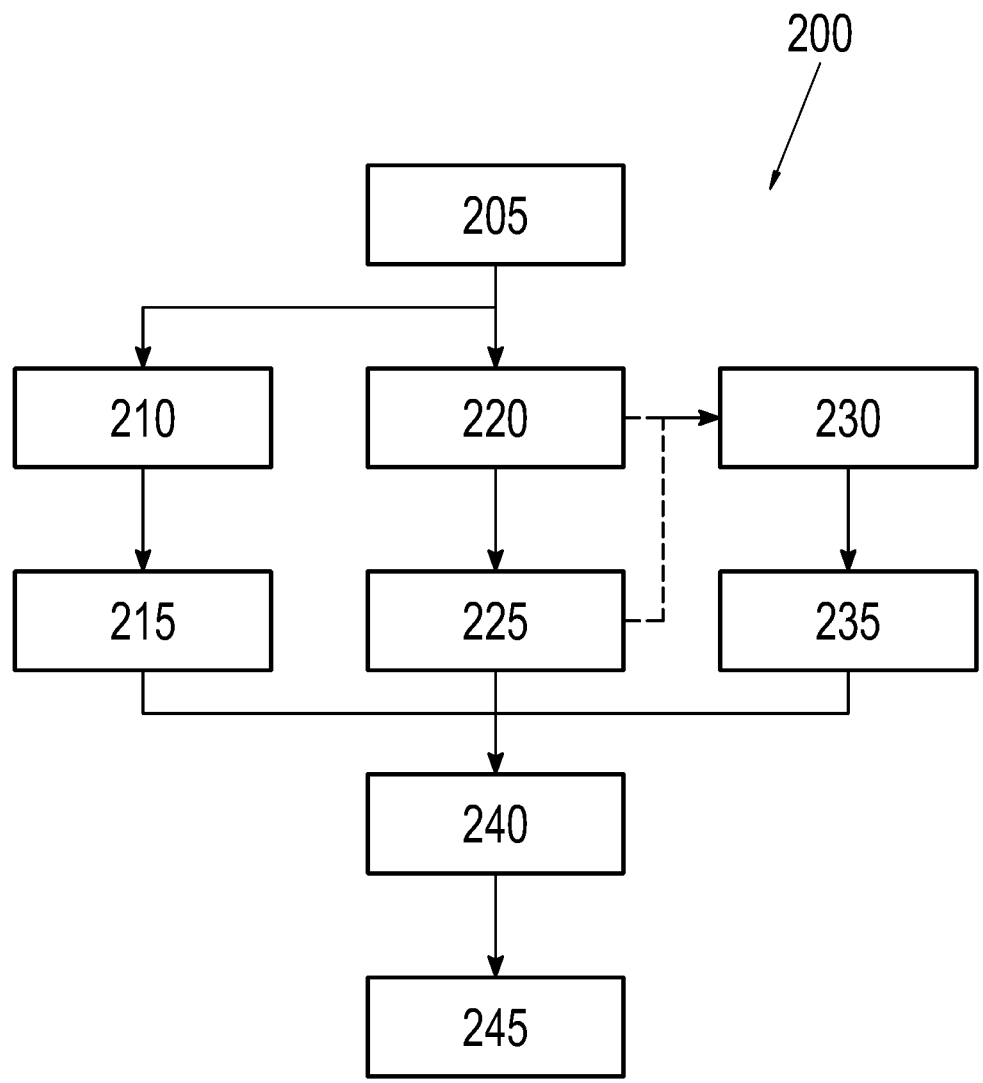
FIG. 2 shows a flow chart for a method.

FIG. 2 shows a flow chart for an exemplary method 200, which can be executed in particular by the control unit 130 on board a motor vehicle 105. In a first step 205, the environment 150 of the motor vehicle 105 can be scanned, e.g. by means of the scanner 135. A bus stop 120 in the environment 150 can be detected by this means. The location of the bus stop 120 can also be determined on the basis of a position of the motor vehicle 105 and corresponding map data. Such a determination can be verified with the scanning by the scanner 135.

In a step 210 the passenger transport device 110 can then be detected, and optionally classified, in order to determine a structure, transport capacity, and/or number and positions of boarding and/or exiting persons. In a subsequent step 215, a movement of the passenger transport device 110 can be determined, in particular in the form of a trajectory.

In a corresponding manner, a person in the vicinity of the passenger transport device 110 or the bus stop 120 can be detected in step 220, and the movement of this person can be determined in step 225, preferably in the form of another trajectory. Furthermore, it is possible to determine whether the person is a passenger 125, in particular on the basis of its movement. These passengers 125 can be subdivided into boarding and exiting passengers 125. A person who neither exits nor boards is not regarded as a passenger 125. Passengers 125 can also be identified in order to classify them as a person that moves more slowly, e.g. an elderly person, a person carrying luggage, a baby carriage, a person with a walker, an injured or fragile person, a person with a wheelchair, or a child. The classification can be used to anticipate the movement of a passenger 125.

A passenger 125 is preferably classified in step 230 as belonging to the first group 155 of boarding passengers 125, or the second group 160 of exiting passengers 125, in particular on the basis of their determined trajectory. By way of example, a movement of the group 155, 160 can be determined in step 235 based on the number of detected passengers 125 and/or the estimated speed of the detected passengers 125. The movement of a group 155, 160 can also be predicted. In this case, it can be taken into account that the movements of boarding and exiting passengers 125 may affect one another, in particular when there are no specific entrances and exits, but instead, the passengers board through the same doorway that the exiting passengers use.

A probability can be determined in step 240, at which a departure of the passenger transport device 110 takes place within a predetermined, upcoming time period. It is also possible to determine the upcoming point in time at which the departure would normally take place. The departure normally takes place after the boarding procedures and exit procedures have been completed at all of the doors in the passenger transport device 110. The boarding normally takes place after the exiting. The end of the boarding procedure is often difficult to determine from the position of the motor vehicle 105, because the precise position of a boarding passenger 125 may not be detected because it is concealed by the passenger transport device 110. For this reason, an anticipated movement of the passenger 125 or the group 155 he is in can be used for the determination. The time required for opening and/or closing of doors can be taken into account. Furthermore, the length of time that the passenger transport device 110 has already been stopped can also be taken into account, and this time can be compared with a typical or expected time.

One possibility for determining the probability can be expressed by the following formula:

$$BDIE = \left(1 - \left(\sum_{1}^{n} \sigma_{PE_i} w_{PE} + \sum_{1}^{n} \sigma_{PT_i} w_{PT_i} + \sigma_{BT} w_{BT} + \sigma_{BE} w_{BE}\right)\right)$$

$$(w_t t_{stopped})(1 - d_{PB} w_{PB})$$

In which:
BDIE: Bus Driver Intention Estimation, the probability that the passenger transport device 110 will depart within a certain time period;
n: number of people/passengers
PE: Pedestrian Existence Probability, the probability that a detected passenger 125 actually exists and is not a false positive determination;
PT: Pedestrian Trajectory, the trajectory of the passenger 125;
BT: Bus Trajectory, the trajectory of the passenger transport device 110;
BE: Bus Existence Probability, the probability that a detected passenger transport device 110 actually exists and is not a false positive determination;
t time;
PE: Pedestrian-Bus, the distance between an observed passenger 125 and the passenger transport device 110;
w: weight, a selected weighting factor;
σ: variance, the variance in the determination.

It should be noted that not all components of the given terms for determining the BDIE need to be taken into account. The probabilities of the existence of a passenger 125 or the passenger transport device 110 preferably take measurement or sensor errors into account. In particular with the use of a radar sensor, the presence of an object may be determined, due to signal reflections, for example, when there is no actual object at the specific location. In a similar context, the existence probability is also referred to as "confidence."

A signal can be output in step 245 if the determined probability exceeds a predetermined threshold value. Different signals can be output for time periods that are regarded differently. The signal can be modified depending on a certain probability. If an upcoming time for the departure has been determined, the signal can be modified based on a time period lasting until this point in time.

REFERENCE SYMBOLS 100 system
105 motor vehicle
110 passenger transport device
115 road
120 bus stop
125 passenger
130 control unit
135 scanner
140 processor
145 interface
150 environment
155 first group: boarding passengers
160 second group: exiting passengers
200 method
205 scanning the environment
210 detecting a passenger transport device
215 determining movement
220 detecting people
225 determining movement
230 determining groups
235 determining movement
240 determining probability
245 signal output

We claim:
1. A method for controlling a motor vehicle, the method comprising:
scanning an environment of the motor vehicle with a scanner that is secured to the motor vehicle;
detecting a passenger transport device substantially stopped in front of the motor vehicle;
detecting a movement of at least one person in the vicinity of the passenger transport device; and
using a processor to determine a probability that the passenger transport device will merge into traffic in front of the motor vehicle based on at least the movement of the person, the processor being secured to the motor vehicle and electrically connected to the scanner.

2. The method according to claim 1, further comprising determining whether a person of the at least one person is a passenger in the passenger transport device based on the movement of the person.

3. The method according to claim 2, wherein it is determined whether the passenger is boarding the passenger transport device or exiting the passenger transport device based on the movement of the passenger.

4. The method according to claim 3, wherein the probability is determined based whether the passenger is boarding the passenger transport device or exiting the passenger transport device.

5. The method according to claim 1, wherein the probability is determined based on an average movement of a group of boarding or exiting passengers.

6. The method according to claim 5, wherein the probability is determined based on movements of an exiting group and a boarding group.

7. The method according to claim 5, wherein the probability is determined based on a number of people in the group.

8. The method according to claim 1, wherein the probability is also determined based on an observed stopping time of the passenger transport device.

9. The method according to claim 1, further comprising determining whether the passenger transport device is substantially stopped at a predefined bus stop.

10. The method according to claim 1, wherein the probability is determined in relation to a predetermined time period.

11. The method according to claim 1, wherein a signal is output if the determined probability exceeds a predetermined threshold value.

12. A device for controlling a motor vehicle, the device comprising:
   a scanner for scanning an environment of the motor vehicle, the scanner being secured to the motor vehicle; and
   a processor that is electrically connected to the scanner, wherein the processor is configured to detect the following based on an output from the scanner:
   a passenger transport device substantially stopped in front of the motor vehicle, and
   a movement of at least one person in the vicinity of the passenger transport device,
   wherein the device is configured to determine a probability that the passenger transport device will merge into traffic in front of the motor vehicle based on at least the movement of the passenger.

13. The device according to claim 12, wherein the device is configured to determine whether a person of the at least one person is a passenger in the passenger transport device based on the movement of the person.

14. The device according to claim 13, wherein it is determined whether the passenger is boarding the passenger transport device or exiting the passenger transport device based on the movement of the passenger.

15. The device according to claim 14, wherein the probability is determined based whether the passenger is boarding the passenger transport device or exiting the passenger transport device.

16. The device according to claim 12, wherein the probability is determined based on an average movement of a group of boarding or exiting passengers.

17. The device according to claim 16, wherein the probability is determined based on movements of an exiting group and a boarding group.

18. The device according to claim 16, wherein the probability is determined based on a number of people in the group.

19. The device according to claim 12, wherein the probability is also determined based on an observed stopping time of the passenger transport device.

20. The device according to claim 12, wherein the probability is also determined based on whether the passenger transport device is substantially stopped at a predefined bus stop.

* * * * *